(12) United States Patent
Moon et al.

(10) Patent No.: US 7,342,943 B2
(45) Date of Patent: *Mar. 11, 2008

(54) RADIO BASE STATION AND METHOD OF CONTROLLING RADIO COMMUNICATIONS

(75) Inventors: Sung Uk Moon, Yokosuka (JP); Toshiyuki Futakata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1015 days.

This patent is subject to a terminal disclaimer.

(21) Appl. No.: 10/279,079

(22) Filed: Oct. 24, 2002

(65) Prior Publication Data

US 2003/0081574 A1    May 1, 2003

(30) Foreign Application Priority Data

Oct. 25, 2001    (JP) ............................. 2001-328205

(51) Int. Cl.
*H04J 1/00*    (2006.01)
(52) U.S. Cl. ...................... 370/487; 370/458
(58) Field of Classification Search ............... 370/314, 370/320, 321, 332, 335, 336, 342, 347, 464, 370/437, 487, 490, 349, 431, 441, 442, 462, 370/458, 337
See application file for complete search history.

(56) References Cited

U.S. PATENT DOCUMENTS 5,991,282 A * 11/1999 Langlet et al. ............... 370/332
6,151,487 A * 11/2000 Kim et al. ................... 455/134
6,711,124 B2 * 3/2004 Khayrallah et al. .......... 370/208
6,804,311 B1 * 10/2004 Dabak et al. ................ 375/347
7,065,131 B2 * 6/2006 Bergel .......................... 375/152
2003/0043770 A1 * 3/2003 Moon et al. ................. 370/337
2003/0128677 A1   7/2003 Hans et al.
2003/0142731 A1 * 7/2003 Bergel .......................... 375/147

FOREIGN PATENT DOCUMENTS

DE    198 50 279    5/2000
EP    0 776 101     5/1997
JP    7-283779      10/1995

(Continued)

OTHER PUBLICATIONS

U.S. Appl. No. 10/235,707, filed Sep. 6, 2002, Pending.

(Continued)

*Primary Examiner*—Brenda Pham
(74) *Attorney, Agent, or Firm*—Oblon, Spivak. McClelland, Maier & Neustadt, P.C.

(57) ABSTRACT

The present invention provides a radio base station using the conventional downlink transmit diversity which can compensate for the degradation of transmission quality even when a plurality of users (mobile terminals) share a single time slot using a code division multiple system. The radio base station includes a channel estimator 16 for performing channel estimation of an uplink time slot; a transmit diversity controller $14_1$ to $14_N$ for controlling the transmit diversity used for downlink time slots DL#1 to DL#N based on said channel estimation and the number of users sharing the downlink time slot when using a code division multiple system; a data transmitter 15 for transmitting data via downlink time slots DL#1 to DL#N using the controlled transmit diversity.

8 Claims, 6 Drawing Sheets

FOREIGN PATENT DOCUMENTS

| | | |
|---|---|---|
| JP | 11-266228 | 9/1999 |
| JP | 11-275035 | 10/1999 |
| JP | 2000-197112 | 7/2000 |
| JP | 2001-94487 | 4/2001 |
| JP | 2001-148649 | 5/2001 |
| JP | 2003-524989 | 8/2003 |
| WO | WO 00/11806 | 3/2000 |
| WO | WO 01/63796 A1 | 8/2001 |

OTHER PUBLICATIONS

U.S. Appl. No. 10/279,079, filed Oct. 24, 2002, Pending.

* cited by examiner

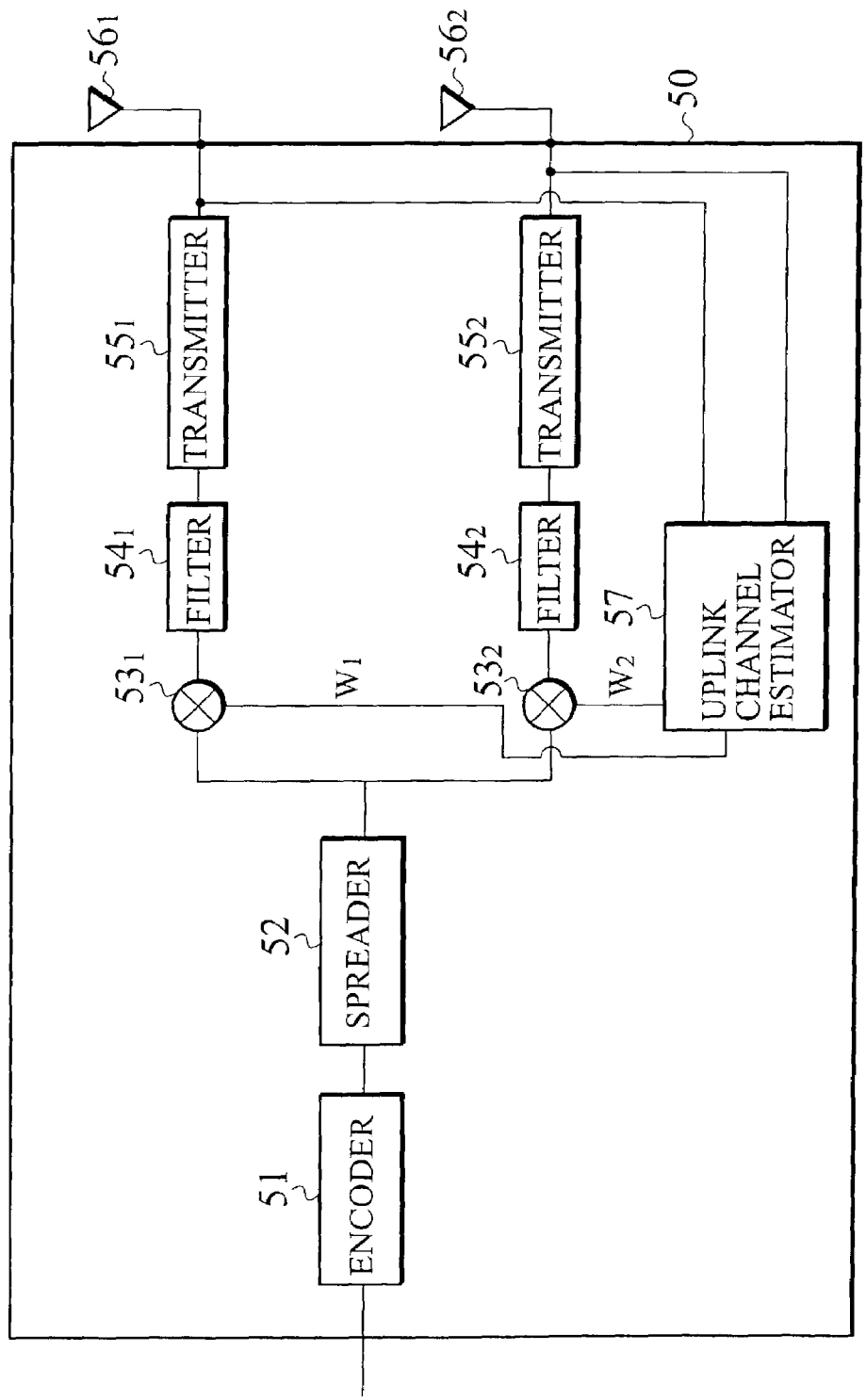

FIG. 2A

| DL #1 | UL #2 | DL #3 | UL #4 | DL #5 | UL #6 | DL #7 | DL #8 | DL #9 | UL #10 | UL #11 | UL #12 | DL #13 | DL #14 | DL #15 |
|---|---|---|---|---|---|---|---|---|---|---|---|---|---|---|

FIG. 2B

| DL #1 | UL #2 | DL #3 | DL #4 | DL #5 | DL #6 | DL #7 | DL #8 | DL #9 | DL #10 | DL #11 | DL #12 | DL #13 | DL #14 | DL #15 |
|---|---|---|---|---|---|---|---|---|---|---|---|---|---|---|

RADIO BASE STATION AND METHOD OF CONTROLLING RADIO COMMUNICATIONS

CROSS REFERENCE TO RELATED APPLICATION

This application is based upon and claims the benefit of priority from the prior Japanese Patent Application No. P2001-328205, filed on Oct. 25, 2001; the entire contents of which are incorporated herein by reference.

BACKGROUND OF THE INVENTION

1. Field of the Invention

The present invention relates to a radio base station and a method of controlling radio communications. More particularly, the present invention relates to a radio base station and a method of controlling radio communications which use transmit diversity in IMT-2000 CDMA TDD systems.

2. Description of the Related Art

Fading typically occurs in radio communications, greatly degrading transmission quality, that is, bit error rate characteristics.

Transmit diversity is a known method for compensating such degradation of transmission quality due to fading. Downlink transmit diversity, a kind of transmit diversity, will be described below.

FIG. 1 partially illustrates the configuration of a radio base station 50 using a conventional downlink transmit diversity. FIG.1 illustrates functions relating to data transmission. The radio base station 50 includes, as shown in FIG. 1, an encoder 51, a spreader 52, weighting units $53_1$ and $53_2$, filters $54_1$ and $54_2$, transmitters $55_1$ and $55_2$, antennas $56_1$, and $56_2$, and an uplink channel estimator 57.

The encoder 51 is connected to the spreader 52, encoding and interleaving data to be transmitted (hereinafter referred to as transmission data) under a predetermined scheme and transmitting the encoded and interleaved transmission data to the spreader 52.

The spreader 52 is connected to the encoder 51 and the weighting units $53_1$ and $53_2$, spreading and scrambling transmission data received from the encoder 51 under a predetermined scheme and transmitting the spread and scrambled transmission data to the weighting units $53_1$ and $53_2$.

The weighting units $53_1$ and $53_2$ are connected to the spreader 52, the filters $54_1$ and $54_2$, and the uplink channel estimator 57, and weighting (e.g., multiplying) transmission data received from the spreader 52 by weighting factors W1 and W2 received from the uplink channel estimator 57. The weighting units $53_1$ and $53_2$ transmit the weighted transmission data to the filters $54_1$ and $54_2$.

The filters $54_1$ and $54_2$ are connected to the weighting units $53_1$ and $53_2$ and the transmitters $55_1$ and $55_2$, filtering transmission data received from the weighting units $53_1$ and $53_2$ and transmitting the filtered transmission data to the transmitters $55_1$ and $55_2$.

The transmitters $55_1$ and $55_2$ are connected to the filters $54_1$ and $54_2$ and the antennas $56_1$ and $56_2$, transmitting transmission data received from the filters $54_1$ and $54_2$ via radio lines with predetermined carrier frequencies, in cooperation with the antennas $56_1$ and $56_2$.

The uplink channel estimator 57 is connected to the weighting units $53_1$ and $53_2$ and the antennas $56_1$ and $56_2$, monitoring uplink radio communications channels (e.g., time slots, spread codes or carrier frequencies) set for the antennas $56_1$ and $56_2$, thereby estimating (performing channel estimation) the status of the uplink radio communications channels (e.g., waveform distortion, delay fluctuation, amplitude fluctuation and phase lag), determining the weighting factors W1 and W2 based on the channel estimation, and transmitting the determined weighting factors W1 and W2 to the weighting units $53_1$ and $53_2$.

STD (selective transmit diversity), a kind of downlink transmit diversity, for example, uses "1" or "0" as the weighting factor W1 and correspondingly "0" or "1" as the weighting factor W2. As a result, transmission data is transmitted only via either a first transmission line consisting of the filter $54_1$, transmitter $55_1$ and antenna $56_1$ or a second transmission line consisting of the filter $54_2$, transmitter $55_2$ and antenna $56_2$.

TxAA (Transmission Adaptive Array), a kind of downlink transmit diversity, can assign weighting factors to the antennas $56_1$ and $56_2$, respectively.

FIGS. 2(a) and 2(b) illustrate time slot configurations used in IMT-2000 CDMA TDD radio communications channels. In IMT-2000 CDMA TDD systems, a plurality of users (mobile terminals) can share a single time slot using a code division multiple system, and a single user (mobile terminal) can occupy a plurality of time slots.

When, for example, time slots shown in FIG. 2(a) are used, the uplink channel estimator 57 causes down link time slot #3 to reflect the channel estimation of uplink time slot #2 and causes downlink time slot #5 to reflect the channel estimation of uplink time slot #4, thus controlling the downlink transmit diversity based on the channel estimation of the immediately preceding uplink time slots.

When time slots shown in FIG. 2(b) are used, for example, the uplink channel estimator 57 controls the downlink transmit diversity so that the channel estimation of uplink time slot #2 is reflected by all subsequent time slots (#3 to #15).

In a radio base station and a method of controlling radio communications using the conventional downlink transmit diversity, when a plurality of users (mobile terminals) share a single time slot using a code division multiple system, radio communications are simultaneously performed between a plurality of antennas and all users (mobile terminals) sharing the single time slot. Therefore the radio base station and the method of controlling radio communications using the conventional downlink transmit diversity may result in any greatly increased degree of interference signals from other users (mobile terminals) which need to be eliminated and the degradation of transmission quality.

BRIEF SUMMARY OF THE INVENTION

An object of the present invention is to provide a radio base station and a method of controlling radio communications using the conventional downlink transmit diversity, which can compensate for the degradation of transmission quality in radio communications even when a plurality of users (mobile terminals) share a single time slot using a code division multiple system.

According to a first aspect of the present invention, there is provided a radio base station which comprises: a channel estimator configured to perform channel estimation of an uplink time slot; a transmit diversity controller configured to control the transmit diversity used for each downlink time slot based on said channel estimation and the number of users sharing the downlink time slot when using a code division multiple system; and a data transmitter configured to transmit data via the downlink time slot using the controlled transmit diversity.

The transmit diversity controller preferably further controls the transmit diversity used for each downlink time slot based on the time difference from the instant of said channel estimation The transmit diversity controller preferably further determines whether or not to use the transmit diversity for each downlink time slot.

The transmit diversity controller preferably further determines a kind of the transmit diversity used for each downlink time slot.

According to a second aspect of the present invention, there is provided a method of controlling radio communications, which comprises the steps of: a) performing, at a radio base station, channel estimation of an uplink time slot; b) controlling, at a radio base station, the transmit diversity used for each downlink time slot based on said channel estimation and the number of users sharing the downlink time slot when using a code division multiple system; and c) transmitting, at the radio base station, data in the downlink time slot when using the controlled transmit diversity.

In the step b), the radio base station preferably further controls the transmit diversity used for each downlink time slot based on the time difference from the instant of said channel estimation.

In the step b), it is preferably determined whether or not to use the transmit diversity for each downlink time slot.

In the step b), a kind of the transmit diversity used is determined for each downlink time slot.

BRIEF DESCRIPTION OF THE DRAWINGS

FIG. 1 is a schematic diagram of a radio base station according to a conventional art;

FIGS. 2A and 2B are diagrams illustrating time slot configurations used in the radio base station of the conventional art;

DETAILED DESCRIPTION OF THE INVENTION

[Configuration of Radio Base Station According to Embodiment of the Present Invention]

Figure 3:
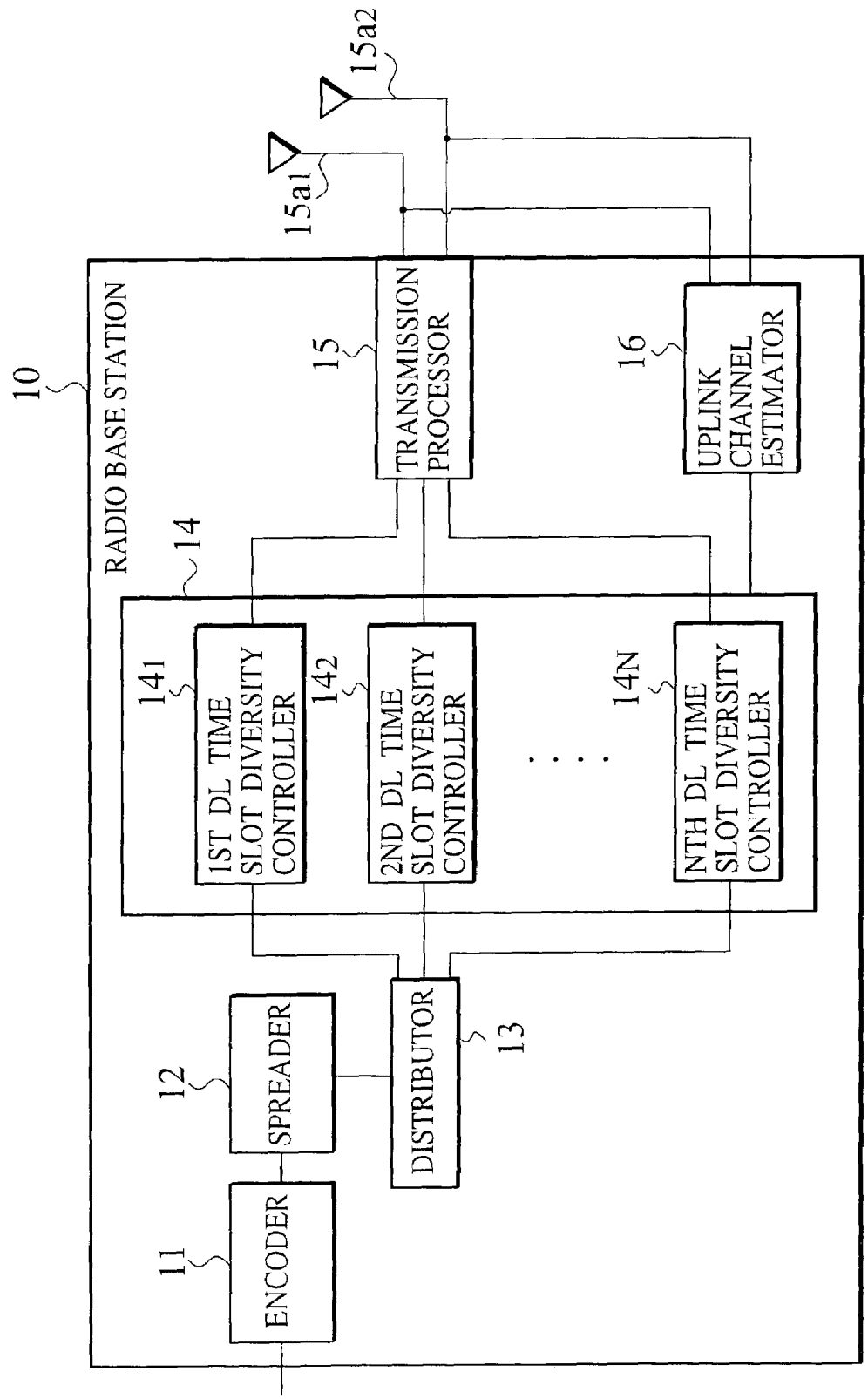
FIG. 3 is a schematic diagram of a radio base station according to an embodiment of the present invention.

The configuration of a radio base station according to an embodiment of the present invention will be described with reference to the accompanying drawings. FIG. 3 is a diagram illustrating the general configuration of a radio base station 10 according to this embodiment.

The radio base station 10 of this embodiment transmits transmission data to radio information terminals (mobile terminals) via radio communications channels. The radio base station 10 includes, as shown in FIG. 3, an encoder 11, a spreader 12, a distributor 13, a downlink (DL) time slot diversity controller 14, a transmission processor 15, and an uplink channel estimator 16.

The encoder 11 and the spreader 12 have the same functions as those of the encoder 51 and the spreader 52 of the conventional radio base station 50. The encoder 11 is connected to the spreader 12. The spreader 12 is connected to the encoder 11 and the distributor 13.

The distributor 13 is connected to the spreader 12 and the downlink time slot diversity controller 14, dividing transmission data received from the spreader 12 into downlink (DL) time slots (DL#1 to DL#N) and transmitting the respective divided transmission data of the time slots (DL#1 to DL#N) to the corresponding first to Nth downlink (DL) time slot diversity controllers $14_1$ to $14_N$.

The distributor 13 transmits the number of users sharing each of downlink (DL) time slots (DL#1 to DL#N) to the corresponding first to Nth downlink (DL) time slot diversity controllers $14_1$ to $14_N$.

The downlink time slot diversity controller 14 is connected to the distributor 13, the transmission processor 15 and the uplink channel estimator 16, including the first to Nth downlink time slot diversity controllers $14_1$ to $14_N$, corresponding to the downlink time slots (DL#1 to DL#N).

The first to Nth downlink time slot diversity controllers $14_1$ to $14_N$ determines whether or not to use the transmit diversity, and determine which transmit diversity to use (a kind of transmit diversity) for the corresponding downlink time slots (DL#1 to DL#N) based on the channel estimation of uplink channels performed by the uplink channel estimator 16 and the number of the users transmitted from the distributor 13, thereby performing diversity control. The transmit diversity used here includes, for example, downlink transmit diversity (such as STD and TXAA).

In short, the first to Nth downlink time slot diversity controllers $14_1$ to $14_N$ constitute a transmit diversity controller for controlling the transmit diversity used for each of the downlink time slots DL#1 to DL#N.

In the time slots shown in FIG. 2A, for example, when a plurality of users (mobile terminals) share a downlink (DL) time slot DL#3 and a single user (mobile terminal) occupies a downlink (DL) time slot DL#5, the third downlink time slot diversity controller $14_3$ may determine the nonuse of the transmit diversity (or the use of STD) for DL#3, and the fifth downlink time slot diversity controller $14_5$ may determine the use of TxAA for DL#5.

Alternatively, in the time slots shown in FIG. 2A, for example, when the number of users sharing a downlink (DL) time slot DL#3 is more than predetermined number and the number of users occupying a downlink (DL) time slot DL#5 is less than predetermined number, the third downlink time slot diversity controller $14_3$ may determine the nonuse of the transmit diversity (or the use of STD) for DL#3, and the fifth downlink time slot diversity controller $14_5$ may determine the use of TxAA for DL#5.

The transmission processor 15 is connected to the downlink time slot diversity controller 14 and the uplink channel estimator 16, processing transmission data received from the downlink time slot diversity controller 14 in accordance with the transmit diversity determined by the downlink time slot diversity controller 14 (e.g., selecting a transmission line or weighting each transmission line), performing filtering as required, and transmitting the processed transmission data via antennas $15_{a1}$ and/or $15_{a2}$.

In short, the transmission processor 15 constitutes a data transmitter for transmitting data with the downlink time slots DL#1 to DL#N, using the controlled transmit diversity.

The uplink channel estimator 16 is connected to the downlink time slot diversity controller 14 and the antenna $15_{a1}$ and $15_{a2}$, monitoring uplink radio communications channels set for the antenna $15_{a1}$ and $15_{a2}$, estimating the status of the uplink radio communications channels (such as waveform distortion, delay fluctuation, amplitude fluctuation, and phase log) (performing channel estimation), and transmitting the channel estimation to the downlink time slot diversity controller 14.

In short, the uplink channel estimator 16 constitutes a channel estimator for performing channel estimation of uplink time slots UL#1 to UL#N.

[Operation of Radio Base Station of This Embodiment]

Figure 4:
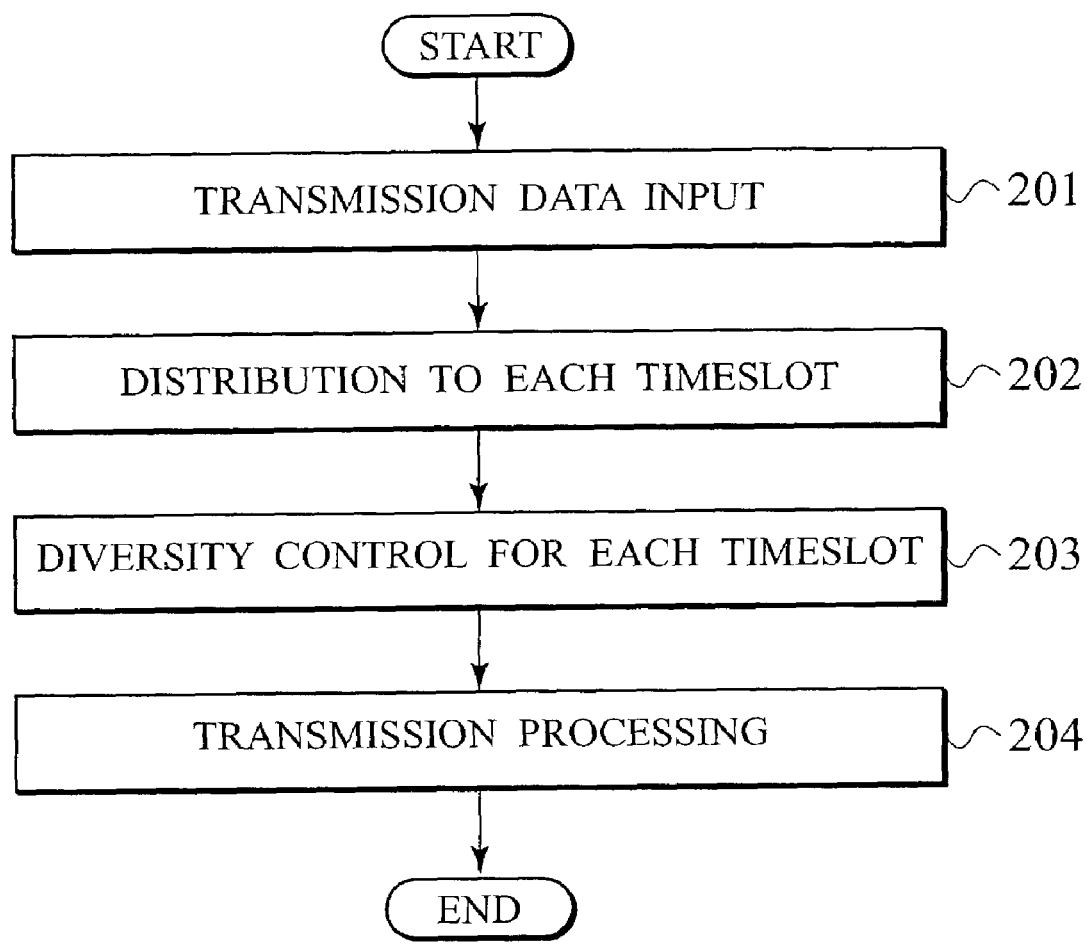
FIG. 4 is a flowchart illustrating the sequence of operations of the radio base station of the embodiment to transmit transmission data received, via a radio communications channel.

The operation of the radio base station 10 with the above configuration will be described with reference to FIG. 4. FIG. 4 is a flowchart illustrating the operation of the radio base station 10 for transmitting received transmission data via radio communications channels.

At step 201 shown in FIG. 4, transmission data to be transmitted via radio communications channels is supplied to the encoder 11. The encoder 11 encodes and interleaves the supplied transmission data and transmits the transmission data to the spreader 12. The spreader 12 spreads and scrambles the transmission data and transmits the transmission data to the distributor 13.

At step 202, the distributor 13 divides the transmission data received from the spreader 12 into each of the down link time slots (DL#1 to DL#N) and transmits the respective divided transmission data of the time slots (DL#1 to DL#N) to the corresponding first to Nth downlink time slot diversity controllers $14_1$ to $14_N$.

At step 203, the first to Nth downlink time slot diversity controllers $14_1$ and $14_N$ determine whether or not to use the transmit diversity for the corresponding downlink time slots (DL#1 to DL#N) or determine which transmit diversity to use based on the channel estimation of the uplink channels performed transmitted from the uplink channel estimator 16 and the number of the users transmitted from the distributor 13, thereby performing diversity control.

At step 204, the transmission processor 15 processes the transmission data received from the downlink time slot diversity controller 14 in accordance with the transmit diversity determined by the downlink time slot diversity controller 14 (e.g., selects a transmission line or weights each transmission line), performs filtering as required, and transmits the processed transmission data via the antennas $15_{a1}$ and $15_{a2}$.

[Function/Effect of Radio Base Station of This Embodiment]

The radio base station 10 according to this embodiment has the first to Nth downlink time slot diversity controllers $14_1$ and $14_2$ which control the transmit diversity used for the respective downlink time slots (DL#1 to DL#N) based on the number of users sharing the downlink time slots (DL#1 to DL#N). Therefore the radio base station 10 according to this embodiment controls the determination of the nonuse of the transmit diversity when a plurality of users (mobile terminals) a single time when slot using a code division multiple system, thus preventing any greatly increased degree of interference signals from other users (mobile terminals) which need to be eliminated and the degradation of downlink transmission quality.

[Configuration of Radio Base Station According to Modification 1]

Figure 5:
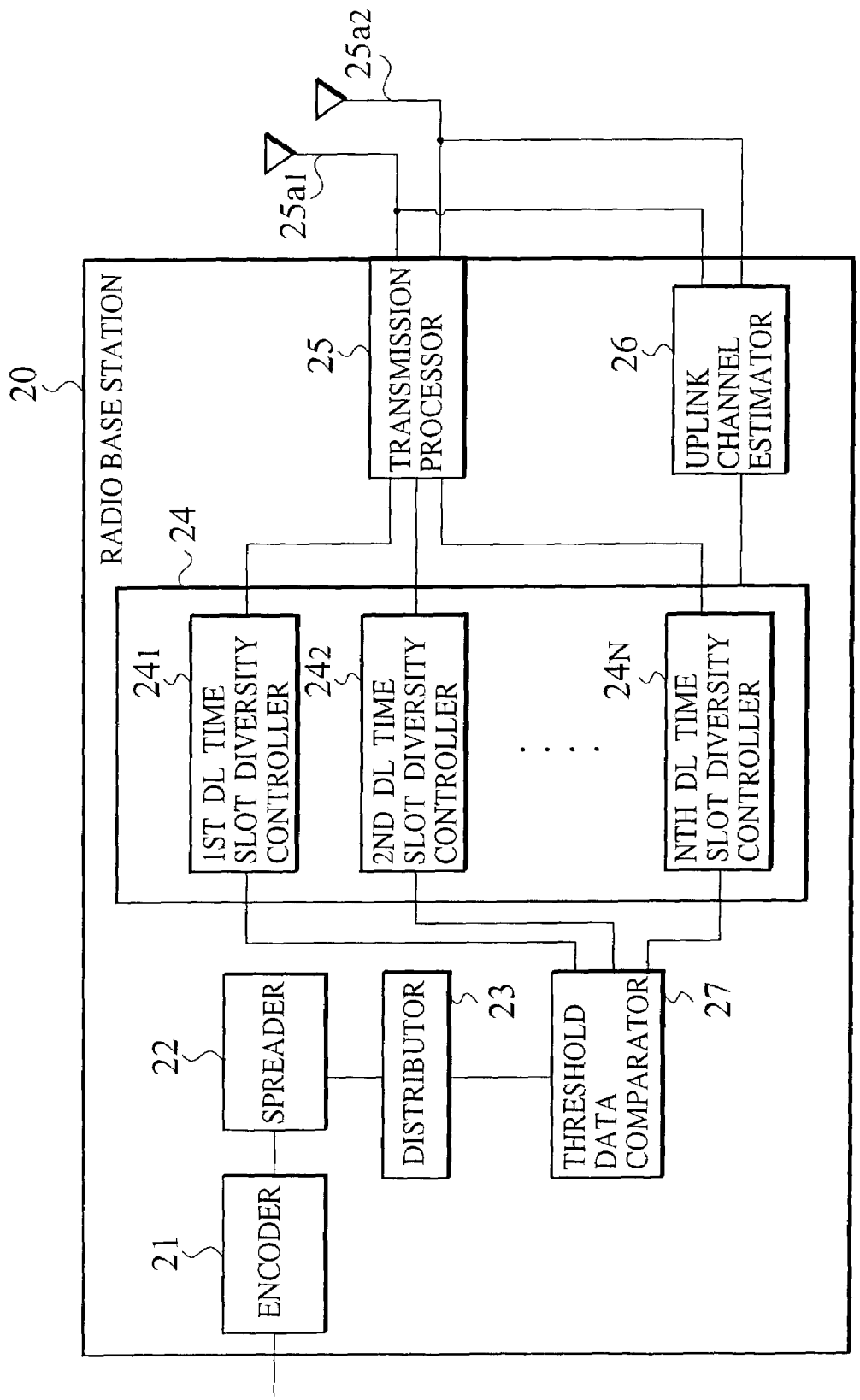
FIG. 5 is a schematic diagram of a radio base station according to a modification of the embodiment of the present invention.

The present invention is not limited to the above embodiment, and may have a threshold data comparator 27 provided between a distributor 23 and a downlink time slot diversity controller 24 as shown in FIG. 5.

The threshold data comparator 27 measures time differences between each of downlink time slots (DL#1 to DL#N) and a time slot on which channel estimation is performed, and compares the time differences found by the measurements with a time difference as predetermined threshold data. The threshold data comparator 27 transmits the comparison results to corresponding first to Nth downlink time slot diversity controllers $24_1$ to $24_N$.

The first to Nth downlink time slot diversity controllers $24_1$ to $24_N$ determine whether or not to use the transmit diversity for the corresponding downlink time slots (DL#1 to DL#N), and determine which transmit diversity to use based on the channel estimation of the uplink channels by an uplink channel estimator 26, the number of the users transmitted from the distributor 23 and the comparison results received from the threshold data comparator 27, thereby performing diversity control. Transmit diversity used here includes downlink transmit diversity (such as STD and TxAA), for example.

In short, the first to Nth downlink time slot diversity controllers $24_1$ to $24_N$ constitute a transmit diversity controller for controlling the transmit diversity used for each of the downlink time slots DL#1 to DL#N.

In the time slots shown in FIG. 2B, for example, when a plurality of users (mobile terminals) share each of the downlink time slots DL#5 to DL#6 and a single user (mobile terminal) occupies each of the downlink time slots DL#3 to DL#4, the third to forth downlink time slot diversity controllers $24_3$ to $24_4$ may determine the use of TxAA for DL#3 to DL#4 which are time slots not exceeding a time difference as predetermined threshold data (e.g., four time slots) and occupied by a single user (mobile terminal). On the other hand, the fifth to fifteenth downlink time slot diversity controllers $24_5$ to $24_{15}$ may determine the use of STD (or the nonuse of the transmit diversity) for DL#5 to DL#15.

[Operation of Radio Base Station of This Modification]

Figure 6:
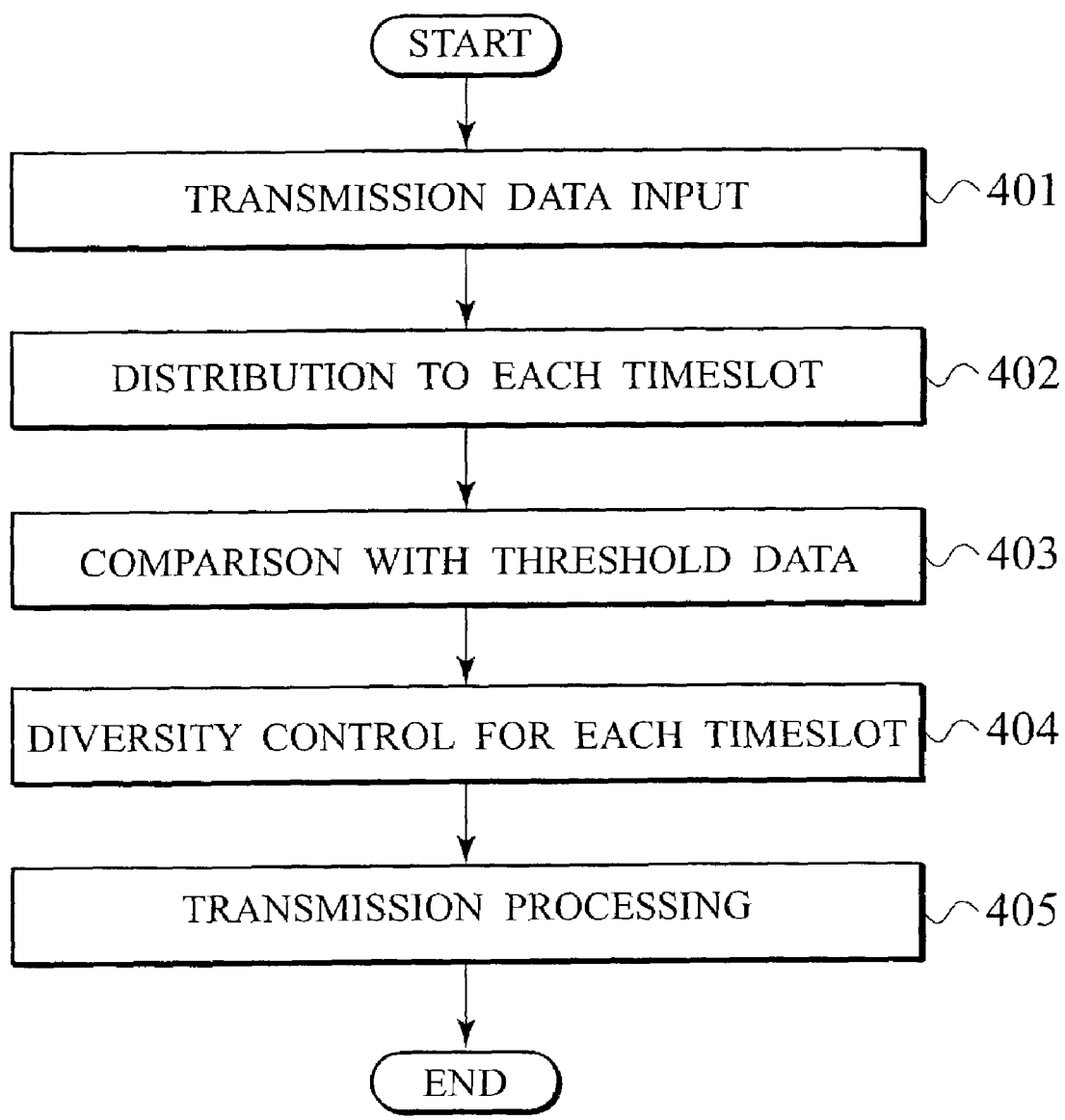
FIG. 6 is a flowchart illustrating the sequence of operations of the radio base station of the modification of the present invention to transmit transmission data received, via a radio communication channel.

The operation of a radio base station 20 with the above configuration will be described with reference to FIG. 6. FIG. 6 is a flowchart illustrating the operation of the radio base station 20 for transmitting received transmission data via radio communications channels.

At step 401 shown in FIG. 6, transmission data to be transmitted via radio communications channels is supplied to an encoder 21. The encoder 21 encodes and interleaves the supplied transmission data and transmits the transmission data to a spreader 22. The spreader 22 spreads and scrambles the transmission data and transmits the transmission data to the distributor 23.

At step 402, the distributor 23 divides the transmission data received from the spreader 12 into each of the downlink time slots (DL#1 to DL#N) and transmits the respective divided transmission data of the time slots (DL#1 to DL#N) to the corresponding first to Nth downlink time slot diversity controllers $24_1$ to $24_N$.

At step 403, the threshold data comparator 27 measures time differences between each of the downlink time slots (DL#1 to DL#N) and a time slot on which channel estimation is performed, and compares the time differences found by the measurements and a time difference as predetermined threshold data. The threshold data comparator 27 transmits the comparison results to the corresponding first to Nth downlink time slot diversity controllers $24_1$ to $24_N$.

At step 404, the first to Nth downlink time slot diversity controllers $24_1$ to $24_N$ determine whether or not to use the transmit diversity, and determine which transmit diversity to use for the corresponding downlink time slots (DL#1 to DL#N), based on the channel estimation of uplink channels performed by the uplink channel estimator 26, the number of the users transmitted from the distributor 23 and the comparison results received from the threshold data comparator 27, thereby performing diversity control.

At step 405, a transmission processor 25 processes the transmission data received from the downlink time slot diversity controller 24 in accordance with the transmit diversity determined by the downlink time slot diversity controller 24 (e.g., selects a transmission line or weights each transmission line), performs filtering as required, and transmits the processed transmission data via antennas $25_{a1}$ and $25_{a2}$.

As described above, the present invention can provide a radio base station and a method of controlling radio communications using the downlink transmit diversity, which can compensate for the degradation of transmission quality in radio communications even when a plurality of users (mobile terminals) share a single time slot using a code division multiple system.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio base station comprising:
    a channel estimator that performs channel estimation of an uplink time slot;
    a transmit diversity controller that controls transmit diversity used for each downlink time slot based on said channel estimation and the number of users sharing the downlink time slot when using a code division multiple system; and
    a data transmitter that transmits data in said downlink time slot using said controlled transmit diversity.

2. A radio base station as set forth in claim 1, wherein:
    said transmit diversity controller further controls the transmit diversity used for each downlink time slot based on the time difference from the instant of said channel estimation.

3. A radio base station as set forth in claim 1, wherein:
    said transmit diversity controller determines whether or not to use the transmit diversity for each downlink time slot.

4. A radio base station as set forth in claim 1, wherein:
    said transmit diversity controller determines a kind of the transmit diversity used for each downlink time slot.

5. A method of controlling radio communications, comprising the steps of:
    a) performing, at a radio base station, channel estimation of an uplink time slot;
    b) controlling, at said radio base station, transmit diversity used for each downlink time slot based on said channel estimation and the number of users sharing the downlink time slot when using a code division multiple system; and
    c) transmitting, at said radio base station, data in said downlink time slot using said controlled transmit diversity.

6. A method of controlling radio communications as set forth in claim 5, wherein:
    in said controlling, said radio base station further controls the transmit diversity used for each downlink time slot based on the time difference from the instant of said channel estimation.

7. A method of controlling radio communications as set forth in claim 5, wherein:
    in said controlling, it is determined whether or not to use the transmit diversity for each downlink time slot.

8. A method of controlling radio communications as set forth in claim 5, wherein:
    in said controlling, a kind of the transmit diversity used is determined for each downlink time slot.

* * * * *